United States Patent
White et al.

(10) Patent No.: US 8,239,820 B1
(45) Date of Patent: Aug. 7, 2012

(54) COMPLIANCE METHOD AND SYSTEM FOR XML-BASED APPLICATIONS

(75) Inventors: Aaron White, Hollis, NH (US); James Murphy, Amherst, NH (US); Timothy Ewald, Nashua, NH (US)

(73) Assignee: Progress Software Corporation, Bedford, MA (US)

( * ) Notice: Subject to any disclaimer, the term of this patent is extended or adjusted under 35 U.S.C. 154(b) by 1347 days.

(21) Appl. No.: 11/457,851

(22) Filed: Jul. 17, 2006

Related U.S. Application Data (60) Provisional application No. 60/700,172, filed on Jul. 18, 2005.

(51) Int. Cl.
*G06F 9/44* (2006.01)

(52) U.S. Cl. ......... 717/101; 717/100; 717/117; 717/126

(58) Field of Classification Search .................. None
See application file for complete search history.

(56) References Cited

U.S. PATENT DOCUMENTS

| | | | |
|---|---|---|---|
| 6,453,346 B1 | 9/2002 | Garg et al. | |
| 6,513,154 B1 | 1/2003 | Porterfield | |
| 6,647,544 B1 | 11/2003 | Ryman et al. | |
| 6,782,386 B1 | 8/2004 | Gebauer | |
| 6,792,460 B2 | 9/2004 | Oulu et al. | |
| 6,816,898 B1 | 11/2004 | Scarpelli et al. | |
| 6,898,556 B2 | 5/2005 | Smocha et al. | |
| 7,240,279 B1 * | 7/2007 | Chartier et al. | 717/143 |
| 7,434,202 B2 * | 10/2008 | Kramer | 717/117 |
| 7,478,419 B2 * | 1/2009 | Anderson et al. | 726/1 |
| 7,603,358 B1 * | 10/2009 | Anderson et al. | 1/1 |
| 7,743,150 B1 * | 6/2010 | Carter et al. | 709/227 |
| 7,849,448 B2 * | 12/2010 | Yunus et al. | 717/126 |
| 7,885,648 B2 * | 2/2011 | Wray | 717/106 |
| 2003/0120665 A1 * | 6/2003 | Fox et al. | 707/100 |
| 2003/0145281 A1 | 7/2003 | Thames et al. | |
| 2003/0204644 A1 | 10/2003 | Vincent | |
| 2003/0233631 A1 * | 12/2003 | Curry et al. | 717/100 |
| 2004/0030947 A1 * | 2/2004 | Aghili et al. | 714/1 |
| 2004/0088140 A1 | 5/2004 | O'Konski et al. | |
| 2004/0133875 A1 * | 7/2004 | Kramer | 717/101 |
| 2004/0186817 A1 | 9/2004 | Thames et al. | |
| 2004/0186891 A1 * | 9/2004 | Panec et al. | 709/206 |

(Continued)

FOREIGN PATENT DOCUMENTS

EP 1420562 A2 5/2004

(Continued)

OTHER PUBLICATIONS

Bartolini et al., "Towards Automated WSDL-Based Testing of Web Services", Springer-Verlag Berlin Heidelberg 2008, pp. 524-529 <http://www.cs.unicam.it/polini/Articoli/ICSOC2008.pdf>.*

(Continued)

*Primary Examiner* — Thuy Dao
*Assistant Examiner* — Ben Wang
(74) *Attorney, Agent, or Firm* — Wilmer Cutler Pickering Hale & Dorr LLP.

(57) ABSTRACT

A compliance system for design and testing of web services, having an artifact repository storing a set of artifacts and coupled to a runtime engine. The runtime engine includes a rules engine, a results processor and a manager interface, wherein the runtime engine applies a set of encoding requirements to the set of artifacts and a conformance output is generated.

20 Claims, 10 Drawing Sheets

U.S. PATENT DOCUMENTS

| | | | |
|---|---|---|---|
| 2004/0193703 A1* | 9/2004 | Loewy et al. | 709/220 |
| 2005/0038708 A1 | 2/2005 | Wu | |
| 2006/0090155 A1* | 4/2006 | Gurevich | 717/136 |
| 2006/0173985 A1* | 8/2006 | Moore | 709/223 |
| 2006/0195819 A1* | 8/2006 | Chory et al. | 717/117 |
| 2006/0206440 A1* | 9/2006 | Anderson et al. | 705/500 |
| 2006/0230432 A1* | 10/2006 | Lee et al. | 726/1 |
| 2006/0277606 A1* | 12/2006 | Yunus et al. | 726/25 |
| 2007/0168913 A1* | 7/2007 | Sarukkai et al. | 717/101 |
| 2008/0059220 A1* | 3/2008 | Roth et al. | 705/1 |
| 2008/0148346 A1* | 6/2008 | Gill et al. | 726/1 |
| 2008/0172270 A1* | 7/2008 | Eckenroth | 705/7 |
| 2008/0295064 A1* | 11/2008 | Mitra et al. | 717/100 |
| 2009/0319832 A1* | 12/2009 | Zhang et al. | 714/38 |
| 2009/0326997 A1* | 12/2009 | Becker et al. | 705/7 |
| 2010/0017853 A1* | 1/2010 | Readshaw | 726/3 |
| 2010/0030718 A1* | 2/2010 | Anderson et al. | 706/47 |
| 2010/0095266 A1* | 4/2010 | Novak | 717/101 |
| 2010/0312542 A1* | 12/2010 | Van Wyk et al. | 717/126 |

FOREIGN PATENT DOCUMENTS

| | | |
|---|---|---|
| WO | 9922288 | 5/1999 |

OTHER PUBLICATIONS

Karusseit et al., "Policy expression and checking in XACML, WS-Policies, and the jABC", Jul. 21, 2008, ACM, pp. 20-26 <http://dl.acm.org/citation.cfm?id=1197652>.*

Hojaji et al., "Developing a More Comprehensive and Expressive SOA Governance Framework", Jun. 3, 2010, IEEE, pp. 1-5 <http://ieeexplore.ieee.org/stamp/stamp.jsp?tp=&arnumber=5478046>.*

"Extensible Markup Language (XML) 1.0 (Second Edition)", Oct. 6, 2000, [online] [retrieved on Aug. 3, 2006] Retrieved from the internet <URL:http://www.w3.org/TR/2000/REC-xml-20001006>, pp. 1-43, W3C.

"Interoperability: the Key to Quality Web Services", Mar. 2004, [online] [retrieved on Nov. 17, 2004], Retrieved from the internet <URL:http://www.mindreef.com/products/whitepapers/whitepaper-2.html>, pp. 1-9, Mindreef, Inc.

Mitchko, Joe, "Mindreef SOAPscope 1.0", [online] [retrieved on Sep. 27, 2004], Retrieved from the internet <URL:http://www.sys-con.com/webservices/articleprint.cfm?id+597>, pp. 1-3, SYS-CON Media, Inc.

"AmberPoint Express", [online] [retrieved on Dec. 23, 2004], Retrieved from the internet <URL:http://www.amberpoint.com/solutions/express_print.html>, pp. 1-2, AmberPoint Solutions.

Schaffner, Brian, "Debug SOAP apps with Apache TCP Tunnel/Monitor", Jan. 30, 2003, [online] [retrieved on Dec. 23, 2004], Retrieved from the Internet <URL:http://www.builder.com.com/5102-6389-1049605.html>, pp. 1-2, CNET Networks, Inc.

"ProactiveNet 6.0 Optimize Application Performance to Meet Business Objectives" 2004, pp. 1-4, ProactiveNet, Inc., CA.

Martin, Bruce, "Build distributed applications with Java and XML", Feb. 2000, [online] [retrieved on Jun. 10, 2005], Retrieved from the Internet <URL:http://www.javaworld.com/javaworld/jw-02-2000/jw-02-ssj-xml_p.html>, pp. 1-3, Java World.

"A powerful new tool to help validate error-handling code", Nov. 2004, pp. 1-4, Compuware Corporation.

"Agitator", [online] [retrieved on Feb. 15, 2005] Retrieved from the internet <URL:http://www.agitar.com/products/000024.html>, pp. 1-5, Agitar Software, Inc.

Related products including SOAPScope 1.0, SOAPScope 2.0, SOAPScope 3.0 may have been offered for sale more than one year before the effective file date of this application.

Some claimed embodiments of the present invention may have been offered for sale, but not more than one year before the filing date of U.S. Appl. No. 60/700,172, to which priority is claimed.

* cited by examiner

COMPLIANCE METHOD AND SYSTEM FOR XML-BASED APPLICATIONS

RELATED APPLICATIONS

This application claims the benefit of U.S. Provisional Application No. 60/700,172 filed Jul. 18, 2005 which is herein incorporated in its entirety by reference. A related application concurrently filed entitled "Method and System to Collect and Communicate Problem Context in XML-Based Distributed Applications" Ser. No. 11/458,296 is also incorporated by reference herein.

FIELD OF THE INVENTION

The invention relates to a tag-based language constraint framework and methods of execution for determining if the associated documents are used in accordance with the various underlying specifications and interpretations.

BACKGROUND OF THE INVENTION

Extensible Markup Language (XML) provides a way to represent data in a portable, vendor-neutral, human-readable format. The XML specification was defined by the World Wide Web Consortium (W3C) to establish the syntax and semantics of a tag-based language that allows a flexible format for hierarchical information. XML is a pared-down version of the Standard Generalized Markup Language (SGML), a system for organizing and tagging elements of a document. XML is particularly useful for Web documents, and is a metalanguage that essentially is a language for describing other languages. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference. XML has become the preferred format for transferring information between computers particularly as web services.

With respect to accessing XML from an imperative programming language, the W3C defined the Document Object Model (DOM) to facilitate the parsing of XML documents. The DOM is an application programmer's interface to XML data and is available from many programming languages, including Java and JavaScript (also called ECMAScript). The programs access XML data via the tree-like DOM API, and the XML parsers produce a DOM representation of an XML document.

XPath is a separate W3C specification for addressing parts of an XML document. XPath includes a query-like capability for retrieving XML nodes and testing for the existence of document structures and data elements.

There are various specifications that dictate the limitations of general XML with respect to a specific purpose. These are referred to as XML dialects.

Simple Object Access Protocol (SOAP) is a relevant example of a specification and XML dialect for framing XML messages sent between computer processes. SOAP separates the application specific message content from other aspects of message communications like security, addressing or reliability by defining a Body section and a Headers section, respectively. Application developer's focus on application messages and vendor supplied systems can provide the infrastructure parts.

Web Services Description Language (WSDL) as used herein, includes an XML format for describing network services (often web services) as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services).

WSDL is a specification and XML dialect for describing the operations a service provides including how input and output messages are formed. The specific format of the XML messages is defined using a combination of WSDL and XML Schema (XSD). XSD is a specification and XML dialect for describing the type of XML instance documents, in this case XML SOAP message parts. WSDL is extensible to allow description of endpoints and their messages regardless of what message formats or network protocols are used to communicate.

A WSDL description conveys the service's published interface contract. It is frequently made up of many interconnecting WSDL and XSD documents. The complete set of documents describes the service operations and the data types the service expects to use to communicate. The service contract can be difficult to understand in its entirety since WSDL and XSD documents are often built independently by different people or organizations.

These various XML dialects were developed separately for independent purposes and later adapted to current web services stacks. These technologies compose together in ways the individual designers did not define completely so the context of the composite system is different than that originally envisioned by the specification authors. This results in a set of specifications that are sometimes ambiguous, sometimes redundant and often confusing for application developers.

XML, SOAP, WSDL and XSD comprise the core set of specifications used to build and manage XML web services. Web services provide functionality to clients on a computer network. The software readily available for common programming languages and runtime environments, collectively known as a "SOAP stack", provides the messaging capabilities to the application programmer. SOAP stacks are implemented to the specifications and have latent interoperability problems due to ambiguity and the interpretation of the vendor.

The promise of XML web services is to decouple the implementation choices of the server and the client. By agreeing on a standardized, text based communications mechanism, programs on different operating systems at different locations can communicate and change independently. This so called "loose coupling" allows IT systems to evolve more naturally by minimizing what clients and services need to know about one another. SOAP stacks with incompatible assumptions or implemented subsets of the core specifications create interoperability problems. By restricting or qualifying usage of concepts in the WSDL and XSD documents of a service's contract, service implementers can avoid common interoperability problems.

Best Practices are further constraints that a corporation might incorporate into guidelines to improve system quality and increase system development efficiency. The practices focus on constraining and qualifying the use of elements in the core web services specifications. An area of best practice focus is in constraining the WSDL and XSD constructs used so XML messages can be mapped effectively into a wide variety of programming languages. Mapping technologies vary among languages and environments due to the challenges of mapping XML to a language's native data structures. By avoiding aspects of WSDL and XSD these mapping problems are avoided. By applying best practices the mapping can lead to a clean and maintainable API for application developers.

In order to promote more consistent interpretation of the Web service specifications, the Web Services Interoperability Organization (WS-I) was formed to promulgate specific guidelines and recommended practices for using and developing Web services. The WS-I provided the Basic Profile (BP) to address known interoperability issues and is predominantly a restriction of the original WSDL 1.1 specification to the most interoperable practices. However, even within the WS-I, at present there has been no absolute consensus of interoperability and the formulation to ensure the Web services were indeed interoperable. The WS-I has limited its focus to initial areas of inquiry, most notably, ignoring XSD entirely.

While there are many toolkits to help automate the design process of Web services, not all the toolkits behave in the same way, and this leads to a wide range of interoperability problems. In current practice, the entire development team must be integrally involved to ensure that the service is compatible with other interoperable toolkits. The Developer needs to have interoperability concerns in mind from the beginning of the development cycle throughout the entire design and implementation. The Project Manager needs to make it a policy to test for interoperability as part of the quality of their service. And the Tester has to continually check the quality of the service once in operation. Interoperability has become such a major component to the quality of a Web service, it is absolutely necessary to have tools to help detect and solve interoperability problems when they arise.

In theory, interoperability requires an infinite amount of testing under all possible circumstances. However, in practice, the service is continually monitored and any breakage is repaired and the fix becomes part of the regression tests thereby improving the testing process. The WS-I established a suite of test tools that check a Web service's message exchanges and WSDL against the assertions in the BP. The test tools are essentially passive and require the tester to invoke the service manually, capture the SOAP messages off the wire, and log them in the WS-I's log format. Using the tools effectively is not an easy task and the output of their analysis is a large, flat report. The report serves as an indicator of a service that has failed, but using the report to determine exactly what went wrong and how to begin fixing the problem is difficult and tedious.

There are typically two time frames that one can check for conformance: design-time and run-time. Design-time is when the XML documents are first being written, and they are checked for conformance before they are put out for wide release. Run-time is checking XML messages coming to and from a service to make sure that they conform both to specification and to the WSDL document.

What is needed is a system for checking XML applications for conformity of the underlying specification. The diagnosis should be followed-up with the simple and easily navigable interface that displays the results in an intelligible fashion that facilitates any required analysis.

SUMMARY OF THE INVENTION

One embodiment of the invention is a compliance system for web services, having an artifact repository storing a set of artifacts and a runtime engine coupled to the artifact repository, wherein the runtime engine asserts a set of conformance requirements to the set of artifacts producing a results output. The conformance requirements include at least one rule, wherein the rule has declarative patterns and imperative code. The set of artifacts include data from at least one of the group consisting of contracts, messages, and rules.

Another feature includes a collector coupled to a network for retrieving a set of message exchanges, wherein the message exchanges are stored in the artifact repository. The message exchanges can be SOAP messages, and the system provides a run-time testing of the SOAP messages.

A further feature includes having a computer coupled to the compliance system, wherein a user generates WSDL, XSD and XML documents on the computer. The system can provide a design-time testing of the WSDL, XSD and XML documents.

Another embodiment is the compliance system but further comprising a management section, a rules engine and a results processor.

A feature of the conformance requirements include a policy requirement selected from the group consisting of individual policy, team policy, department policy, corporate policy, vendor policy, and industry best practice policy.

The compliance system can also present the results on a screen display with corresponding results pointers linking to an error source.

Another embodiment of the invention is a method for diagnosing and troubleshooting conformance issues of tag-based applications, comprising, providing a set of conformance requirements, executing the conformance requirements on a collection of artifacts, and reporting a set of results, wherein the results contain descriptive content and a results pointer to a location in the collection of artifacts. The conformance requirements can include at least one rule, each rule having declarative pattern and imperative code.

A feature of this method is mapping a failed conformance requirement assertion to a particular node.

Another feature includes a means for changing conformance requirements. Yet a further embodiment includes invoking governance rules.

Another embodiment is a method for encoding conformance requirements in an executable form for use in assessing compliance, comprising generating a conformance profile, the conformance profile comprising a description section and at least one rule category, wherein there is at least one rule in at least one rule category, and wherein the rule has a settable level of severity and asserting the conformance profile against a set of artifacts and generating a results report.

An additional feature is providing a really simple syndication (RSS) feed of the conformance profile. Yet another feature is importing or exporting the conformance profile.

The method also allows interactively analyzing the results report to locate an error source. Another aspect includes wherein at least one rule category is selected from the group consisting of individual policy, team policy, department policy, corporate policy, vendor policy, and industry best practice.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention encompasses a number of embodiments and features for diagnosing and troubleshooting conformance and compliance issues, particularly tag-based web documents. This includes features that allow the user to capture and render the results, in a simple manner to allow analysis of problems and explanations to resolve the problem.

It should be readily apparent that the various implementations provided herein fully illustrate embodiments of the invention, and are not intended to limit the scope of the invention.

XML Artifacts: Service Interface Contracts and Message Exchanges

The present invention provides a collaborative multi-user system for working with XML artifacts. In one embodiment, the present system stores and operates on XML messages exchanged by Web services and their clients as well as on the XML contracts that describe the messages.

Figure 1:
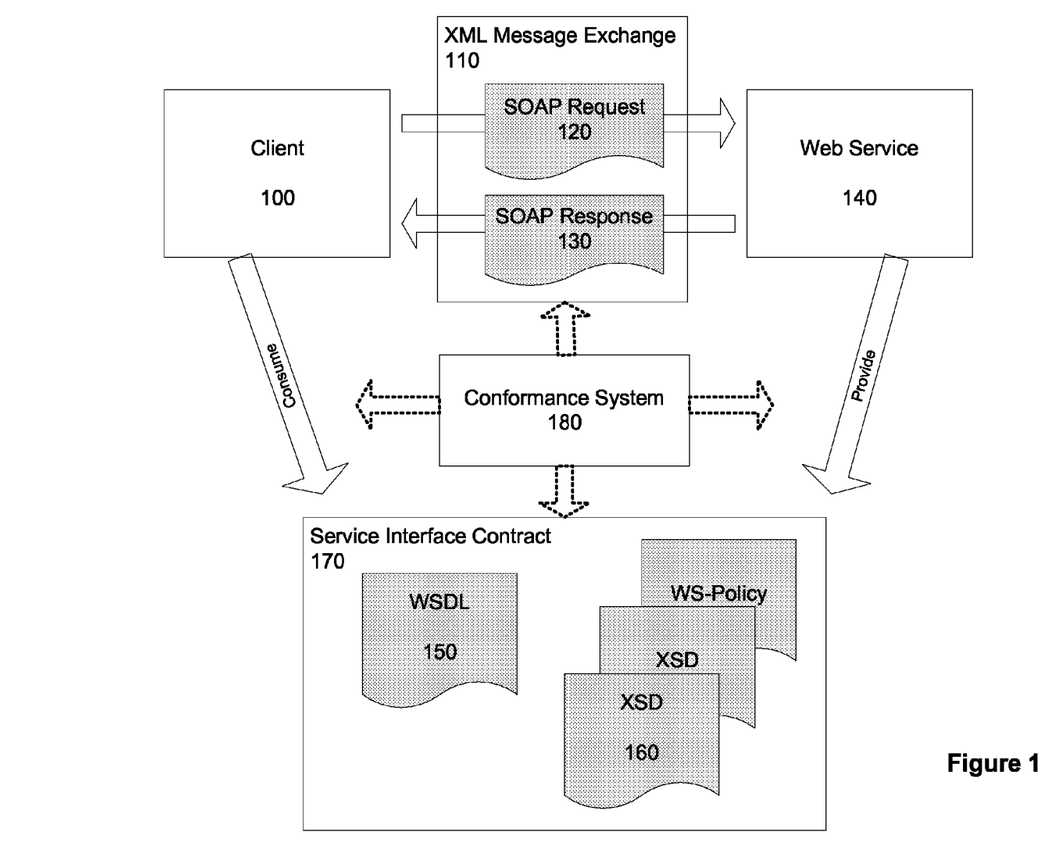
FIG. 1 is a block diagrammatic perspective of the primary XML documents of interest and how they relate to a web services client and server system, and showing the artifacts that are analyzed for conformance according to one embodiment of the invention.

FIG. 1 shows the various sources of artifacts according to one embodiment and the relationship to the conformance system 180. The elements for one type of web services system such as primary client 100 and web service server 140 are coupled to illustrate the interrelationship according to this embodiment. The term artifacts as used herein shall be the broad definition as established by the W3C Web Services Glossary, namely a piece of digital information. An artifact may be any size, and may be composed of other artifacts. Examples of artifacts include a message, a URI, an XML document, a PNG image, and a bit stream.

The messages used in communication between the client 100 and web service 140 are the SOAP request messages 120 and SOAP response messages 130 that together form an XML message exchange 110. The XML message exchange 110 is one kind of artifact that may be employed by the conformance system 180. The XML message exchange 110 is combined with additional metadata to further characterize the client 100-server 140 interaction.

Metadata as used herein, shall include information that brings context to the data being processed, such as data about the data, information pertaining to the context of related information, information pertaining to the origin of data, information pertaining to the location of data, information pertaining to the meaning of data, information pertaining to the age of data, information pertaining to the heading of data, information pertaining to the units of data, information pertaining to the field of data and/or information pertaining to any other information relating to the context of the data. This metadata includes transport data like Hypertext Transfer Protocol (HTTP) headers, network topology data like sender and receiver computer names and Internet Protocol (IP) addresses, as well as time and date information. The Metadata is gathered or obtained by various means and can be used by the Conformance System 180 for the further processing as detailed herein.

Another kind of artifact is the Service Interface Contract 170 that includes the collection of WSDL 150, XSD 160 and other related documents. These artifacts are provided to the conformance system 180 by various input mechanisms. The services interface contract is part of the web services and provides the input and output formats of the system, wherein the artifacts from the services interface contract are provided to the conformance system 180.

Messages are loaded into the present invention by several methods, wherein the specific method is not relevant once the messages are stored, such as in a repository. One example is gathering live message traffic from a network with a multi-mode message collector that captures messages by packet sniffing, port forwarding or HTTP proxy. Each of these mechanisms illustrates different modes of "man-in-the-middle" capturing. SOAP Messages can also be collected from inside a client or service process via installed agents and sent to the artifact repository using an integration API. Messages can also be created within the present invention, where the software acts as the client or service, and so has natural access to the request and response messages.

In one embodiment, a collector coupled to the Conformance System 180 monitors the network traffic according to a destination Uniform Resource Locator (URL) provided by the user and any associated responses therewith.

Contracts of various forms are loaded into the present invention via the Service Interface Contract 170 from several different sources including a URL, file on disk, or imported via an integration API from another system that may be obtained from the consumer, provider, or third-party. A service's contract typically consists of the Message interchange formats defined using XML Schema and Message Exchange Patterns (MEPs) defined using WSDL.

When a contract is imported, the present invention captures and stores a snapshot of all of the documents associated with that contract. Collectively, these documents are called a contract closure. The Closure abstraction encapsulates information about the entire set of documents, including metadata such as the location (URL) it was loaded from, the file at the root of the closure, and the relationships between the files in the closure (that is, which files import or include which other files) and any errors generated during the import. The individual document abstractions encapsulate the actual byte streams of the XML files themselves.

Services and their associated interfaces should generally remain stable, enabling them to be re-configured or re-aggregated to satisfy the changing environment. Services remain stable by relying upon standards-based interfaces and well-defined messages such as SOAP and XML schemas for message definition. Services interact through explicit message-passing over well-defined boundaries and the interaction should be based upon a service's policies, schema, and contract-based behaviors. A boundary represents the border between a service's public interface and its internal, private implementation. A service's boundary can be, for example, published by means of WSDL and may include assertions dictating the expectations of a given service. Services communicating using XML schema-based messages are agnostic to both programming languages and platforms, thereby ensuring broader levels of interoperability. Schema defines the structure and content of the messages, while the service's contract defines the behavior of the service itself.

Conformance System Overview

Figure 2:
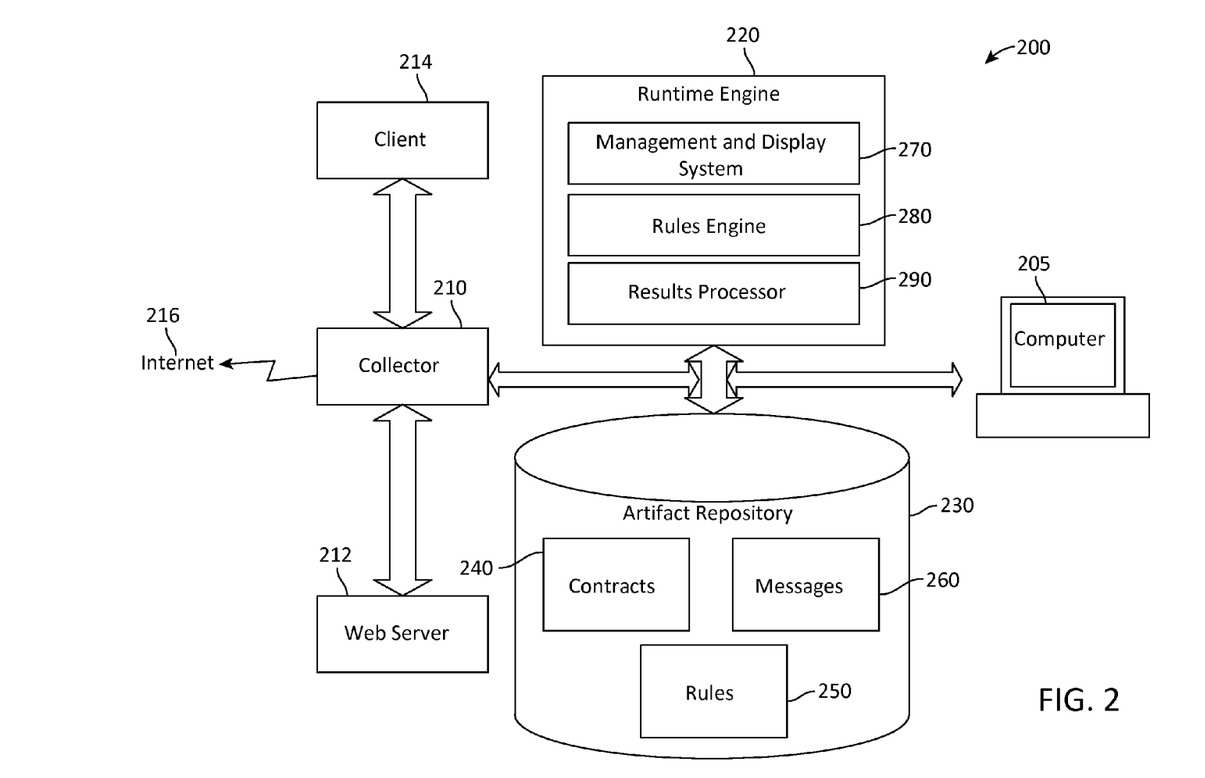
FIG. 2 is a block diagrammatic perspective of the high level components of the present invention according to one embodiment, wherein the invention is divided between an active process for executing conformance rules and an artifact repository for storing/retrieving artifacts along with conformance rules.

Referring to FIG. 2, a top level perspective illustrates some of the components of the conformance system 200 of the present invention according to one embodiment. The basic components include a runtime engine 220 and an artifact repository 230. The runtime engine 220 enables the processing for executing conformance rules along with an artifact repository 230 for storing/retrieving artifacts and conformance rules.

According to one embodiment, the artifacts are from a message exchange, such as run-time testing of SOAP messages across a network, wherein messages can enter the artifact repository in many ways. The messages may be collected from a live system via a message collection process or the messages can be constructed synthetically in a text editor or constructed by other means as known in the industry. In a typical active client/server exchange, there is typically some form of collector 210 that can be coupled to one or more web servers 212, one or more clients 214 and even coupled to the Internet 216. The collector 210 mines the data required for the conformance system 200. The artifact repository 230 accumulates the various artifacts and once stored in the artifact repository 230 the XML message exchanges 260 and service interface contracts 240 as well as the rules 250 are available to the conformance system runtime engine 220.

The artifacts can also be incorporated into the artifact repository 230 during design-time testing such as the WSDL, XSD and other XML documents for a web service. For example, a computer 205 can be coupled to the artifact repository 230 and runtime engine 220 thereby allowing the user (not shown) to test the XML artifacts for compliance prior to launching the associated product.

The contracts 240 are loaded into the system by uploading files or by providing a url that the system uses to download the files and store them into the repository 230. Rules are authored directly in the system using a rule editor and once authored can be exported and imported into other repositories. The contracts 240 and rules 250 may be obtained from the services interface contract as described herein.

The conformance system runtime engine 220 is coupled to the artifact repository 230, wherein the artifact repository 230 contains, for example, the XML artifacts, their metadata and the results for reporting. The conformance system runtime engine 220 consists of several sub-components for managing and configuring the system, executing conformance analysis runs and reporting on the results. These components include the Management and Display System 270, the Rules Engine 280, and the Results Processor 290.

Management System 270 provides the operator interface to the system and allow user intervention at various stages. The Rules Engine 280 contains the mechanisms that processes the XML artifacts as input using Conformance Rules as configuration. The Results Processor 290 is the system that interprets conformance analysis results and presents the links from the rule output to the XML artifacts.

The rules engine 280 order the rules to be run and provides the execution context for the rule logic bringing the SOAP messages Service interface contracts and rules together to evaluate the rule. The results processor 290 handles storage and presentation of execution results.

Rule Model

Figure 3:
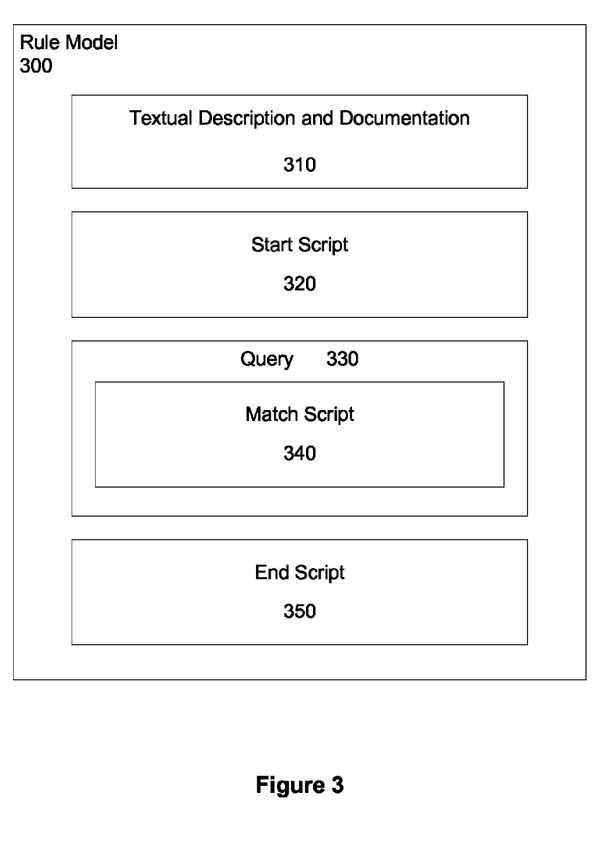
FIG. 3 is a block diagrammatic perspective of one embodiment of the constituent parts of a conformance rule.

Referring to FIG. 3, at the center of the conformance system runtime engine is the Rule Model 300, since the engine executes a set of these rules against a collection of artifacts. The Rule Model 300 is essentially the data structure the rules engine uses. Each rule is a mix of declarative and imperative code that identifies aspects of one or more XML artifacts and examines them for compliance with a requirement. The declarative patterns are an XML query used to identify the portion(s) of an XML artifact that should be processed by the imperative script code.

A rule encodes a particular assertion using the combination of a declarative query language and an imperative programming language. The query language extracts XML nodes across documents subject to some criteria. The imperative programming language processes each node, decides whether it or some related node violates the rule assertion, and if so creates one or more result messages. The result message may contain one or more links to specific nodes that are related to the assertion such that the user is presented direct references to the nodes that caused the assertion to fail. The imperative language may also be used to perform pre- and post-processing steps before and after, respectively, the code that processes each node identified by the query language.

The rule is structured as described in FIG. 3 to include descriptive metadata such as textual description and documentation 310 along with functional code fragments. These parts divide the computational aspects of the rule into Start Script 320, Query 330, Query Result Match Script 340 and End Script 350. Objects created in the Start Script 320 are available in the Match Script 340 and End Script 350 so initialization of expensive resources or establishing variables to accumulate results is possible between the Start Script 320 and Match Script 340.

There are several possible query and imperative languages that can be used to implement the present invention, including XPath and JavaScript, XQuery (as both the declarative query language and the imperative programming language), and XPath and a Web service implemented in Java™, C#™, or another imperative programming language. There are several orientations of script fragments that accomplish the same thing.

Figure 4:
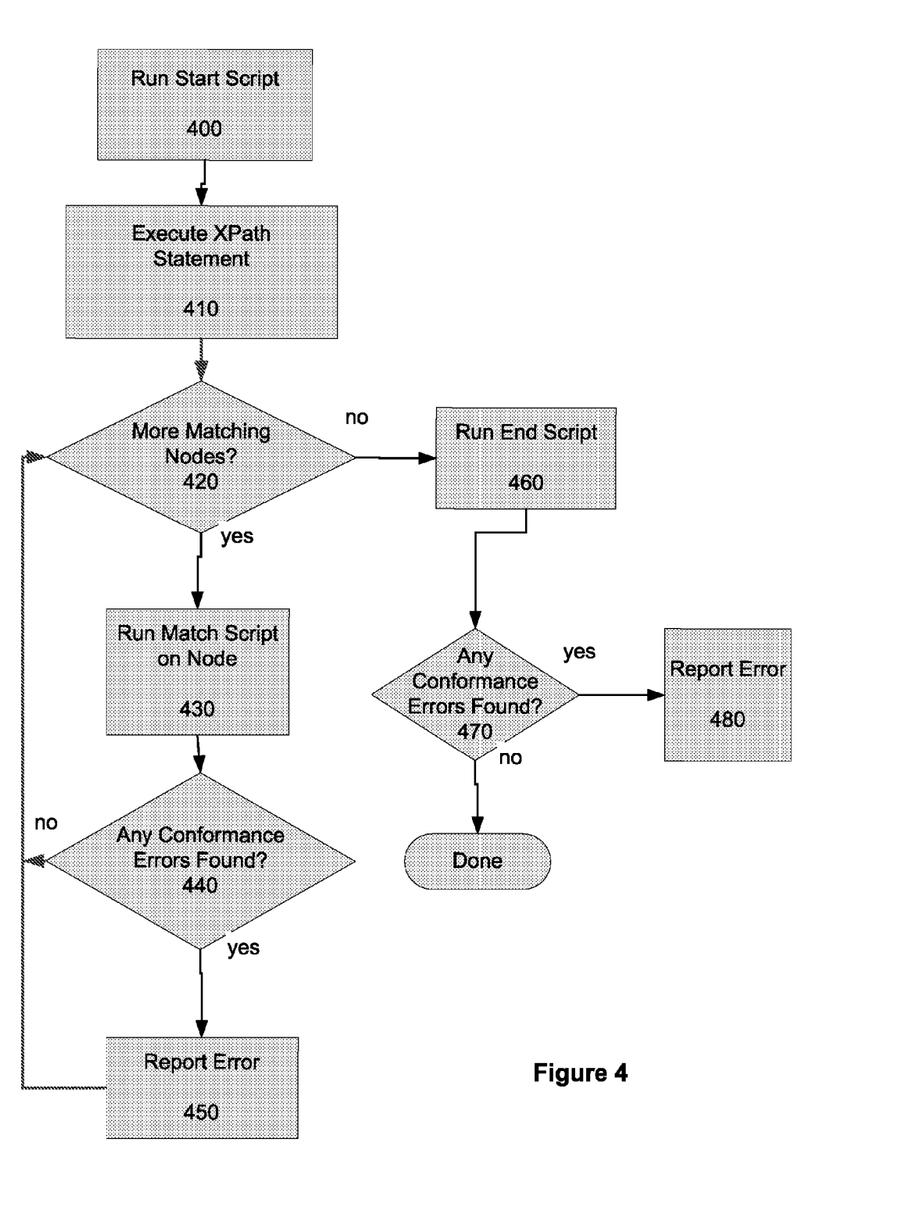
FIG. 4 is a block diagrammatic perspective of one embodiment of the constituent parts of a conformance profile.

Referring to FIG. 4 for an illustrative example of the conformance profile processing where the query language is XPath and JavaScript is the imperative programming language.

The engine executes the optional start script 400. The rule author has the option to initialize various resources for the rule's execution. This might include extensive objects used in the match script any script or variables that will store the result of computations performed over several successive match scripts.

The engine then executes the query 410, in this case an XPath statement for each document in the artifact. For a service interface contract, this is, for example, each WSDL, XSD, and/or WS-Policy document contained in the closure. For a message exchange, this is each request and/or response SOAP message.

For each XML node returned in the query the match script is invoked 420. The engine places each node in script context prior to executing the match script 430 so the script can access the data using the JavaScript DOM API. The engine provides a script API so the match script can populate conformance results based on the node in question and the script logic 440. When a match script generates a result message 450, it is added to the result set for the current analysis run. The results are presented interactively.

The processing iterates over the query results to completion then the end script is executed 460. The end script has the same context as the match script so the rule can report conformance errors 470 in the end script when all queried node have been processed. An error report can be generated 480 with the conformance errors.

| Conformance Rule Example: | |
| --- | --- |
| Name: | Element substitution groups should not be used |
| Description: | Looks for element substitution groups in a schema and generates and error if any are found |
| XPath query: | /xs:schema/xs:element[@substitutionGroup] |
| Match Script: | result.add("Should not use [element substitution groups]", data); Note: result and data items are provided by the engine to add results and to encapsulate the XML DOM node in question. The result string is encoded with square brackets to denote links to the DOM node. |
| End Script: | Not applicable for this example |

A further embodiment of the compliance methodology of the present invention is a Web services interface for invoking governance rules that may be implemented in another system. A user would implement the interface using any tools they choose. The compliance system would invoke the interface, passing an entire contract closure (WSDLs and XSDs) for batch processing. The service would return a list of results to be included in the analysis result set. This makes the analysis engine extensible to other languages, platforms and environments.

Optimization for runtime performance is another feature of the invention where all of the XPath queries are compiled to create an optimized matching algorithm for a given profile. The algorithm in one embodiment is from the XPath processing library. The XPath statements are ordered and prepared by the XPAth library, which is external software in a "ready-to-run" format as defined by the library. The purpose of the algorithm is it to be able to run the rules in a product environment when speed and scalability is important whereas it is less critical in the design environment.

In another embodiment the script only runs on matches so that the matching is optimized for real time operation and the imperative script need not be run on every instance. Further optimizations include bundling together of all the rules with the same XPath query, match once and run all the scripts for that XPath query at the same time. Yet a further feature is compiling the XPath down to direct executable code. For example, compile the JavaScript to Java byte code and even compile an entire profile to a directly executable format.

Conformance Profiles

Generally, an individual rule is not executed against a set of artifacts. Rather the rules are aggregated into a conformance profile. The conformance profile categorizes and prioritizes the various constituent rules.

Figure 5:
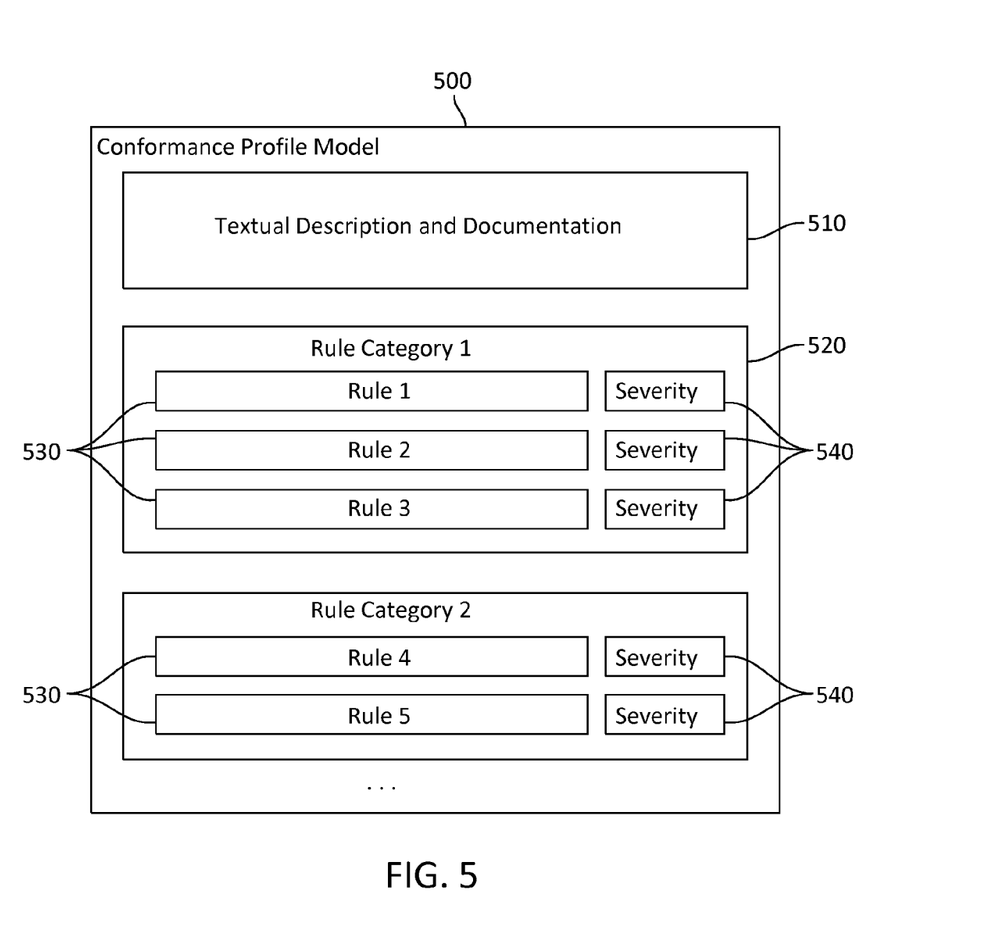
FIG. 5 is a flow chart configured in accordance with one embodiment of the present invention depicting the nominal execution process of the conformance engine execution which incorporates a conformance profile, XML artifacts and generates conformance results.

FIG. 5 depicts the Conformance Profile Model 500 as it relates to descriptive metadata, such as Textual Description and Documentation 510, rules and categories 520 and the inter-relationship among these elements. As shown, there are particular occurrence relationships between rules, categories and profiles. Specifically, a rule is always in exactly one category; A category can have no rules in it; A rule can be in zero or more profiles; A profile can contain zero or more rules.

According to one embodiment there is at least one Rule Category 520 wherein each Rule Category has at least one associated rule 530. The rule 530 has a settable designation of the level of severity 540 for non-conformance with the rule. Thus the present invention allows noting minor efficiency problems in addition to fatal errors.

The arrangement of rules within a profile allows conformance tests to assert a broader specification that an individual rule. The nature of a conformance specification at the profile level can be less technical and more aligned with the usage domain. For example a profile can be constructed from a large collection of rules to check for specific SOAP stack interoperability, compliance with security policy or to fulfill aspects of regulatory obligations of a publicly traded company. And, the user can adjust the severity of the rules depending upon the application. Rules can be reused between these different profiles because the technical nature of a rule makes it applicable in different contexts. A collection of rules make up a profile. The Rule Model is the structural internals of a rule. Finally, the Profile to rule relationship is analogous to a parent to child relationship.

Conformance Engine Execution

The conformance run time engine is the part of the conformance system runtime responsible for loading profiles and their rules and executing the rules against the artifacts provided. The Engine also provides a mechanism to collect the rule results and stores the conformance run results in the artifact repository for later reporting.

Figure 6:
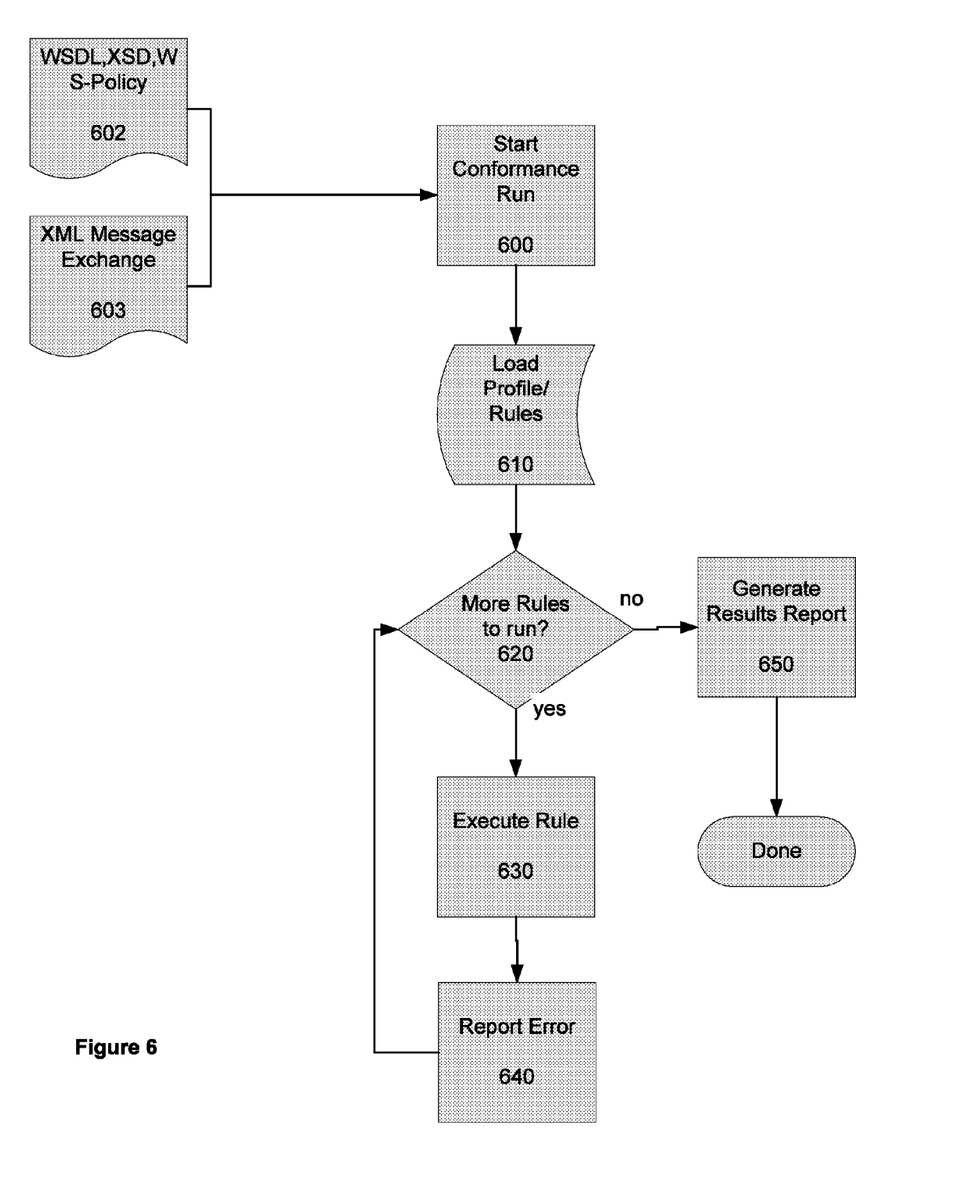
FIG. 6 is a flow chart configured in accordance with one embodiment of the present invention showing the nominal execution process of an individual rule within a conformance analysis execution run.

When an XML artifact is analyzed in terms of a profile, the high-level processing logic works as shown in the flowchart of FIG. 6. The system presents the service interface contract artifacts 602 and/or the message exchange artifacts 603 for conformance analysis. The conformance engine creates a new context for this run 600. The conformance profile and rules are located and loaded from the artifact repository 610. The engine prepares the schedule of rules to execute and determines if there are rules to run against the artifacts presented 620. The engine executes an individual rule 630 by dispatching to the various imperative script fragments and issuing queries as described in FIG. 4. If there are conformance errors found, a notification is presented 640 to indicate progress as the execution progresses. The engine continues executing each rule 620 until the end of the rule schedule. At this point the engine saves the results to the artifacts repository for later reporting 650.

Conformance Results

Figure 7:
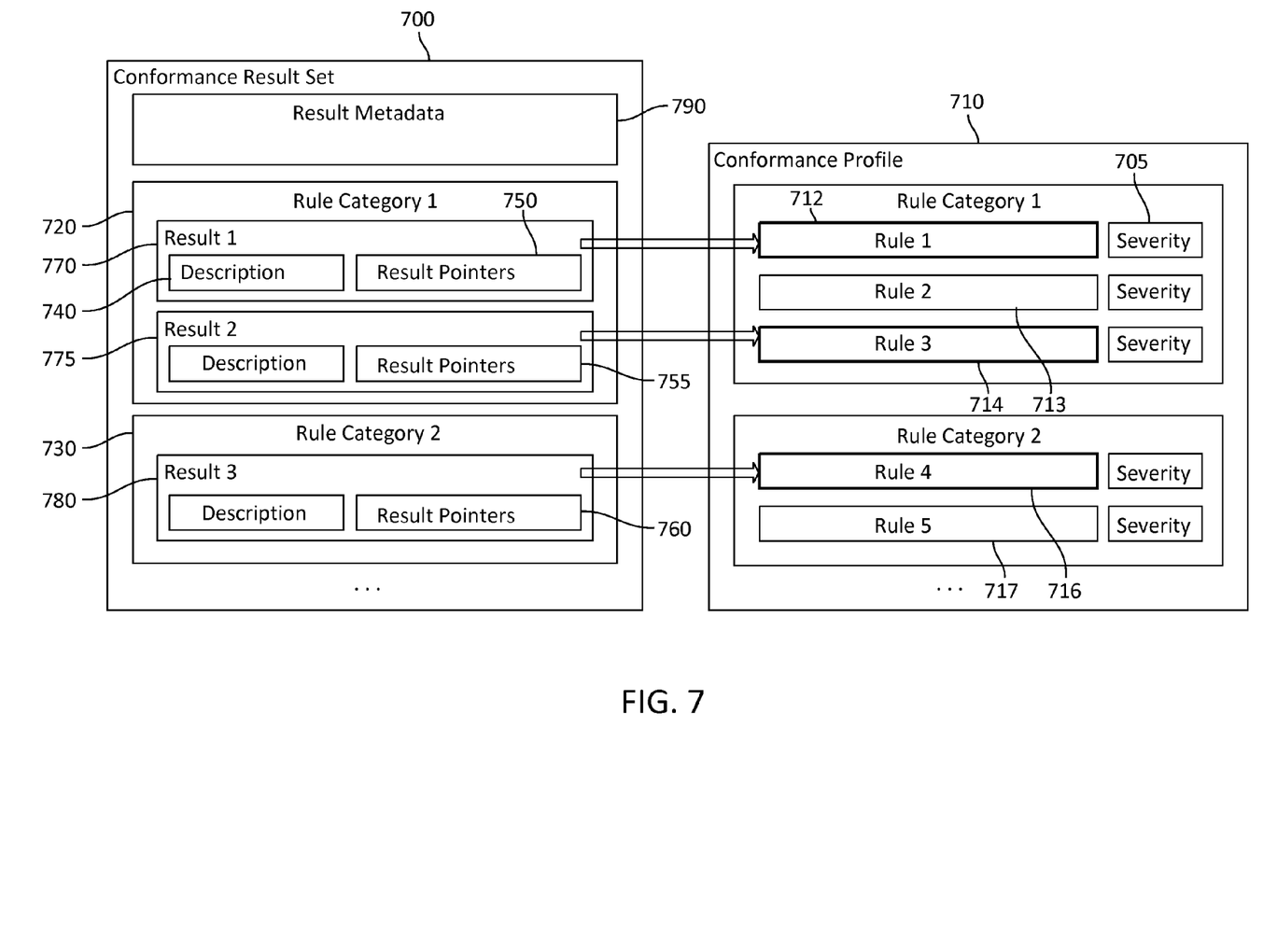
FIG. 7 is a block diagrammatic perspective of one embodiment of the conformance analysis results model, wherein the diagram describes the format of the results and its relationship to the original conformance rules profile.

Referring to FIG. 7, Conformance Results 700 consist of conformance run metadata 790 including date and time, the identity of the user or system executing the run and the input provided to the conformance runtime engine. It also consists of the collection of rule Results 770, 780 produced. Rule Results 770, 775, 780 are generated by the imperative script invoked as part of the rule execution as described in FIG. 4. The Rule Results 770, 775, 780 are linked to the Rules 712, 714, 716 that generated them and the profiles that established the conformance criteria within the Conformance Profile 710. FIG. 7 describes the parts of the Conformance Results and the relationship of those Results 770, 775, 780 to the Conformance Profile 710 and Rules 712, 714, 716.

The result set has a single analysis result pass/fail value, included in the overall result metadata 790, and a list of the result messages generated by individual rules 720 and 730.

A result set's overall pass/fail value is calculated based on the results generated by the individual Rules 712, 714, 716 contained in the Conformance Profile 710. Every Rule 712, 714, 716 is marked with a severity 705 as a suggestion or a failure. If any Rule 712, 714, 716 generates a result message when an XML artifact is analyzed, and the profile used to drive the analysis process indicates that that Rule 712, 714, 716 represents a failure, then the entire result set is marked as failed via the Results Pointers 750, 755, 760. If no Rules 712, 714, 716 generate result messages, or if the rules that generate result messages are treated as suggestions by the Profile 710 used to drive the analysis process, then the entire result set is marked as passed.

Each result message 770, 775, 780 contains a text description of the conformance issue in question 740. This text Description 740 can be combined with descriptive information contained in the rule and the result pointers 750, 755, 760.

The present invention thus provides a methodology for mapping from the result of a failed requirement assertion to the particular node in an XML document (either a WSDL, XSD or other XML language document that describes a service's behavior or data or a SOAP message containing XML data) that caused the assertion to fail, provide detailed feedback on why that node caused the failure, and reference additional information to help a user repair the problem such that the required assertion can be passed.

Result Pointer Linkage

Figure 8:
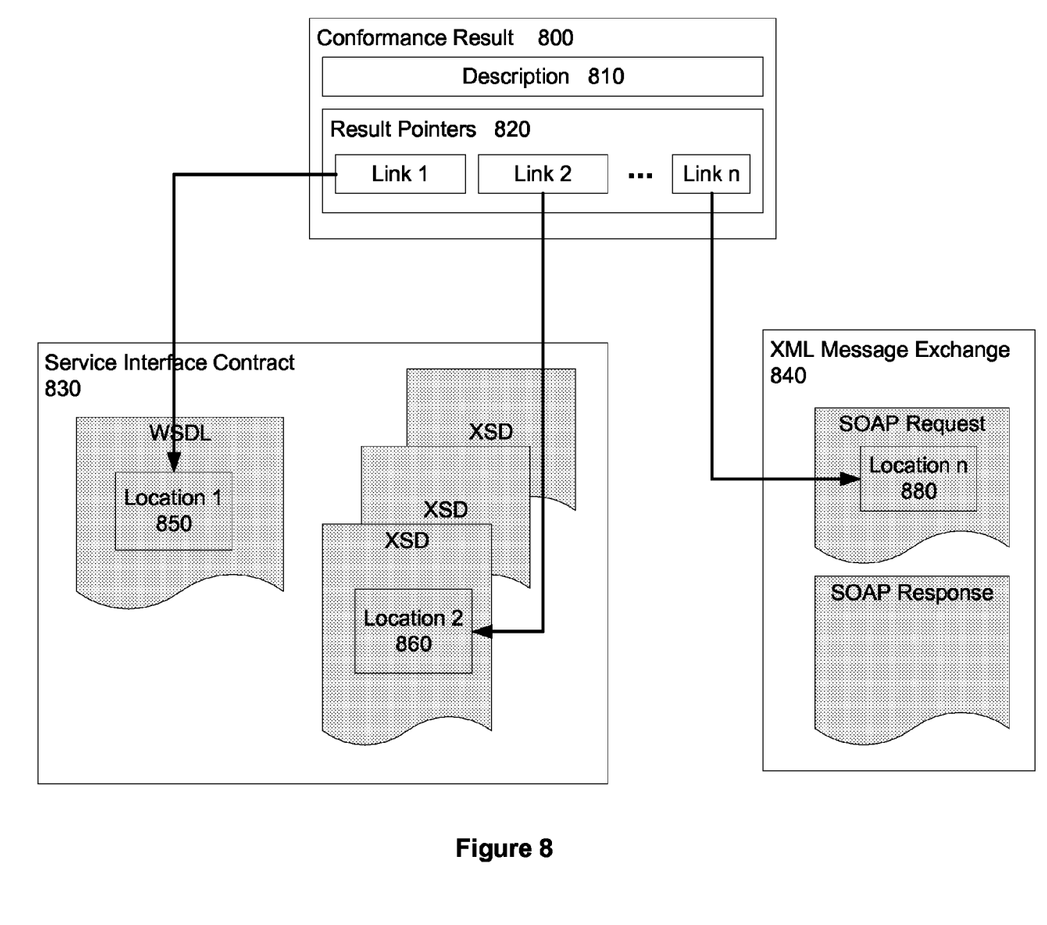
FIG. 8 is a depiction of the linkage capability between conformance results and the specific location in the artifacts involved according to one embodiment.

In addition to the overall pass/fail value, a result set contains all of the result messages generated by all of the rules in the given profile. FIG. 8 is a block diagram representing the relationship between conformance result messages and the XML artifacts according to one embodiment. Each Conformance Result 800 may contain a text Description of the conformance issue 810 as well as Result Pointers 820 to no nodes or to at least one node in one of the XML artifacts being analyzed. These pointers 820 are a detailed link (Link 1, Link2, . . . Link n) to the precise location 850, 860, 880 in one or more XML documents 830 and 840. The storage of these Pointers 820 with the results allows for very specific reporting of conformance issues in an XML specific manner. For example, Link 1 of the Results Pointer can include the detailed link to a WSDL location 850 in the Service Interface Contract. Link 2 of the Results Pointers 820 can include the link to the specific location in an XSD document 860 in the Service Interface Contract 830. And Link n of the Results Pointer 820 can have a link to a specific location in a SOAP Request 880 in the XML Message Exchange 840. These Pointers 820 are in contrast to file line and column numbers that have no direct correlation to the XML Infoset. Equivalent representations of the same XML Infoset may not have the same underlying file representation.

The results generated by the imperative programming language can be presented in an interactive user interface such that link to particular nodes that caused compliance checks to fail can by traversed by the user, highlighting the specific portions of an XML document (either a WSDL, XSD or other XML language document that describes a service's behavior or data or a SOAP message containing XML data) that caused the failure.

Interactive Result Reporting

Figure 9:
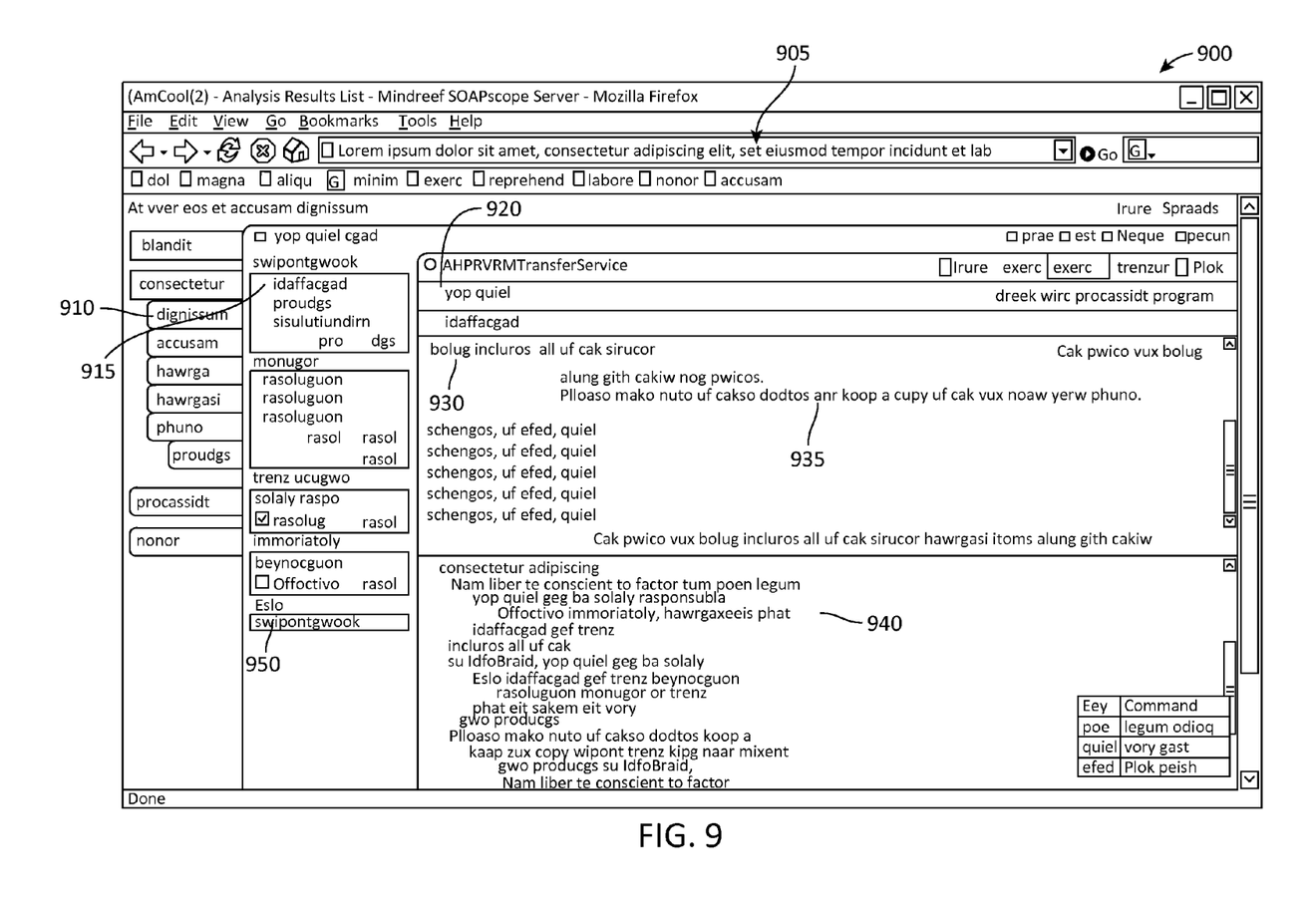
FIG. 9 shows a screen display of the result linkage and interactive result reporting according to one embodiment of the invention.

Referring to FIG. 9, the conformance results are presented interactively and the user can use the result pointers as hyperlinks to navigate to the precise location or locations in one or more XML artifacts that collectively present a problem. This is in contrast to many other tools that present textual reports of errors, but do not provide the precise information necessary to locate the source of those errors in the XML artifacts they are processing. In the Analysis Results List 900 example shown in the screen shot in FIG. 9, a Workspace 910 called 'IAmCool(2)', a web application including the WSDL contract 915 'ANPRVRMTTransferService' is subjected to diagnostic analysis as detailed herein, and there is a noted failure 920. The web application can be represented as a URL 905 or file designation, however in this application the web application is not 'live', rather it is being evaluated based on the stored artifacts and metadata along with the associated rules. A further feature of the present invention is design-time conformance checking involves analyzing XML artifacts as they are being written. They are checked for conformance before they are put out for wide release. These checks can be performed throughout the development cycle.

The XML Data Configuration (XDC) Schema validation section 930 shows an error 935 with a textual description of the error. However, this error further includes a display of the corresponding section of code 940 that caused the error message. As shown, there is an opportunity for the user, whether a client or a third party, to add notes 950 concerning the testing or results.

Importing and Exporting Profiles

Analysis profiles can be exported from one system and imported into another. This allows one entity to produce a set of conformance rules and share them with another entity.

When a profile is exported from the system, it is represented as an XML document. The XML document contains the definitions of all the rules in the profile, including their declarative patterns and imperative code as well as relevant descriptive information. The XML document also includes a definition of the profile itself, namely the rules it contains and their severity level.

When a profile is imported, the contents of the XML document are merged with the data that is already in the conformance system instance. The import process examines each rule and profile individually. If that rule or profile does not exist in the importing artifact repository, the rule or profile is added to the server and marked read-only. If that rule or profile does exist in the importing server and the version in the XML document is newer, the copy in the server is updated. The updated copy has the same read-only or read-write value as the copy of the rule that it overwrites. The read-only/read-write logic ensures that rules and profiles can only be edited on the server where they were created. On all other servers, they can be read-only.

Figure 10:
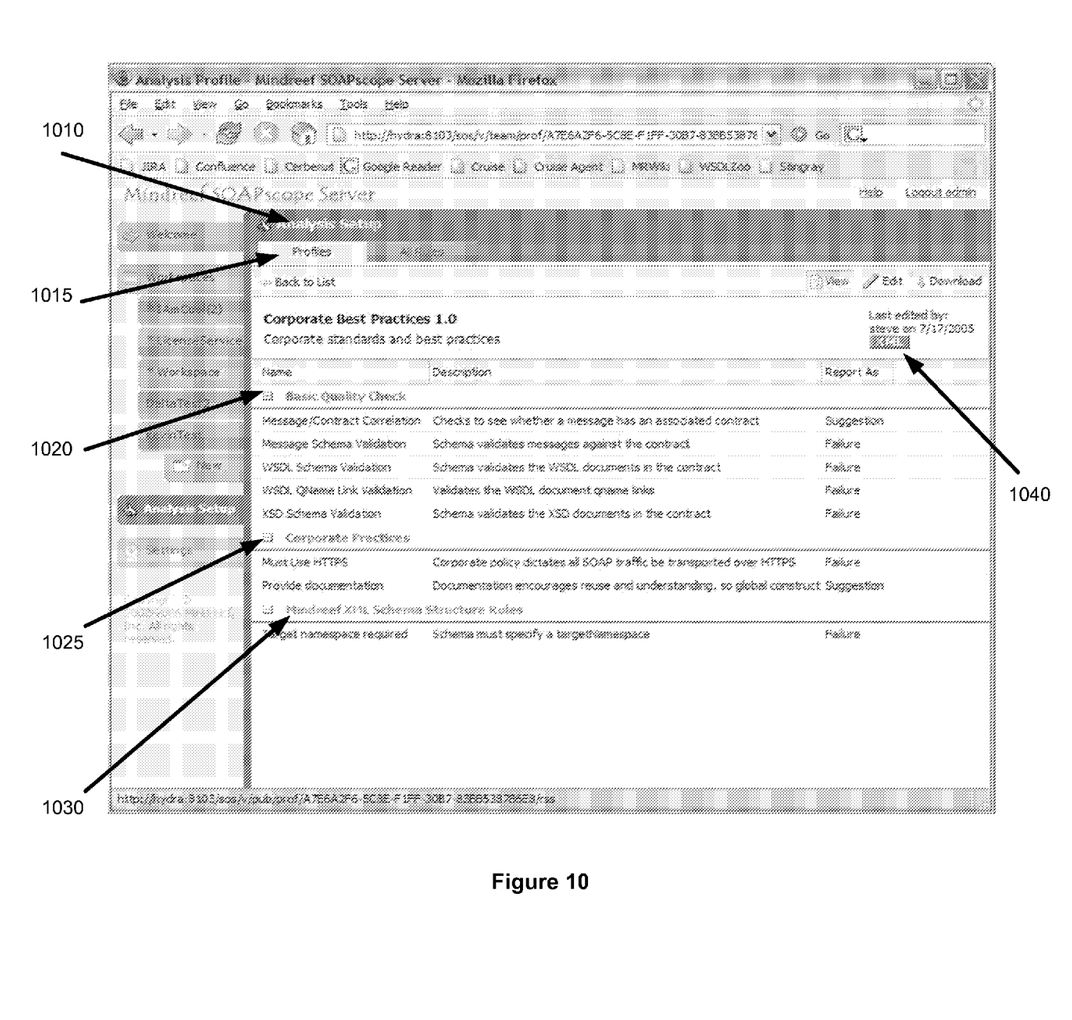
FIG. 10 shows the analysis setup and RSS feed feature depicted on a screen display according to one embodiment of the invention.

In a further embodiment, as shown in FIG. 10, illustrating an analysis setup and RSS feed. As shown in the Profiles 1015 section within the analysis setup 1010, there are several options including a basic quality check 1020 under the basic concept for corporate standards and best practices. The basic quality check performs such tests as message/contract correlation, message schema validation, WSDL schema validation (for messages against the contract), and WSDL Name link validation. Corporate practices are evaluated 1025 as well as schema structure rules 1030. Certain details include a description field and a suggestion field.

The present invention can even provide an RSS feed 1040 to monitor individual analysis profiles. One server can subscribe to another server's profile RSS feed to know when a profile that is created and maintained on a different server is updated. When an updated version becomes available, it can be copied to the subscribed server simply by clicking a button. This allows an automated mechanism to notify administrative and technical staff of such profile modifications.

Analysis rules can be shared across multiple compliance system servers. There are a number of ways to export rules from one compliance system instance and import them into another. This can be accomplished by storing rules on disk in an XML or binary format or by wiring up plumbing to allow one compliance system to extract rules directly from another. A similar mechanism is typically needed to import/export rule configuration settings, i.e. which rules should be used.

Design-Time and Runtime Compliance Analysis

According to one embodiment of the present invention, it solves these aforementioned problems and provides a mechanism for encoding requirements for the use of XML dialects in an executable form. Project architects, developers and testers can test their XML artifacts for compliance with those requirements, helping ensure product success. While described in terms of XML, the present invention is not limited to XML and is adaptable to any tag-based language.

The present invention provides a methodology for design-time testing of the WSDL, XSD, and other XML documents describing the behavior and data formats exposed by a Web service. This testing goes beyond the normal compliance requirements defined by the WSDL, XSD and other XML language specifications for checking whether document instances written in those languages are legal as per those specifications. This testing also goes beyond testing the requirements defined by the WS-I Basic Profile 1.x, which further refines the compliance requirements of WSDL and XSD. This testing is extensible to allow a user to define any individual, team, department, division, corporate, vendor or industry best practice or policy as a requirement and assert that it is met.

One embodiment of the present invention provides a methodology for run-time testing of the SOAP messages generated and sent across the network when a client and a Web service communicate. This testing goes beyond the validation of the message content to ensure that it complies with the description of the service's behavior and data as expressed in the WSDL, XSD and other XML language documents that describe a service. This testing is extensible to allow a user to define any individual, team, department, division, corporate, vendor or industry best practice or policy as a requirement and assert that it is met.

Thus, the compliance system can perform both design and run time analysis of the XML artifacts. For runtime checking, event driven systems adapt an operating web services system to one that populates the conformance system and performs conformance checks as required. Notification based on conformance results informs system operators, managers and designers of the conformance issues.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method executed by a processor for diagnosing and troubleshooting conformance issues for web services, the method comprising:

providing a set of conformance requirements that include at least one rule having a combination of (1) descriptive meta data that includes a designation of a level of severity for non-conformance of said rule and (2) functional code fragments that include a query and a match script;

executing said conformance requirements on a collection of artifacts to produce a set of results, wherein said query is executed for each of said collection of artifacts to identify a portion of an artifact to be processed by said match script and said match script is invoked to determine whether said portion of said artifact conforms to said rule; and if said portion of said artifact causes a non-conformance, generating and including in said set of results at least one result message that contains (1) a descriptive content including (i) a text description of said non-conformance, (ii) date and time of a run resulting in said non-conformance, and (iii) input provided for said run and (2) a results pointer pointing to a location in said artifact of said collection of artifacts where data or code that caused said non-conformance is found.

2. The method according to claim 1, further comprising optimizing a runtime performance.

3. The method according to claim 2, further comprising mapping a failed conformance requirement assertion to a particular node in an XML document.

4. The method according to claim 2, further comprising exporting said set of conformance requirements.

5. The method according to claim 2, further comprising invoking governance rules.

6. A compliance system for web services, comprising:

an artifact repository, said artifact repository having a memory for storing a set of artifacts; and a runtime engine coupled to said artifact repository, wherein said runtime engine asserts to said set of artifacts a set of conformance requirements that include at least one rule having a combination of (1) descriptive meta data and (2) functional code fragments to produce a result output, wherein said descriptive meta data includes a designation of a level of severity for non-conformance of said rule and said functional code fragments include a query and a match script, wherein said runtime engine executes said query for each of said set of artifacts to identify a portion of an artifact to be processed by said match script and invokes said match script to determine whether said artifact conforms to said rule, and wherein, if said artifact causes a non-conformance, said runtime engine generates and includes in said result output at least one result message containing (1) a result pointer that links to a location of a cause of said non-conformance in said artifact and (2) a result meta data that includes (i) a text description of said non-conformance, (ii) date and time of a run resulting in said non-conformance, (iii) an identity of a system executing said run, and (iv) input provided for said run.

7. The compliance system according to claim 6, further comprising a collector coupled to a network for retrieving a set of message exchanges, wherein said message exchanges are stored in said artifact repository.

8. The compliance system according to claim 7, wherein said message exchanges are Simple Object Access Protocol (SOAP) messages, said system providing a run-time testing of said SOAP messages.

9. The compliance system according to claim 6, further comprising a computer coupled to said compliance system, wherein a user generates Web Services Description Language (WSDL), XML Schema (XSD) and Extensible Markup Language (XML) documents on said computer.

10. The compliance system according to claim 9, said system providing a design-time testing of said WSDL, XSD and XML documents.

11. The compliance system according to claim 6, said runtime engine further comprising a management section, a rules engine and a results processor.

12. The compliance system according to claim 6, wherein said set of artifacts include data from at least one of the group consisting of contracts, messages, and rules.

13. The compliance system according to claim 6, wherein said conformance requirements are selected from the group consisting of individual policy, team policy, department policy, corporate policy, vendor policy, and industry best practice policy.

14. The compliance system according to claim 6, said results are presented on a screen display.

15. The compliance system according to claim 6, wherein said query includes descriptive patterns and said match script includes declarative and imperative codes.

16. A method executed by a processor for encoding conformance requirements in an executable form for use in assessing compliance for web services, method comprising:
  generating a conformance profile, said conformance profile comprising a description section and at least one rule category, wherein there is at least one rule in said at least one rule category, and wherein said rule has descriptive meta data, functional code fragments including a query and a match script, and a designation of a level of severity for non-conformance of said rule;
  asserting said conformance profile against a set of artifacts by executing said query for each of said set of artifacts to identify a portion of an artifact to be processed by said match script and invoking said match script to determine whether said artifact includes at least one of efficiency problems and fatal errors; and
  if said artifact causes said at least one of efficiency problems and fatal errors, generating a results report that includes at least one result message containing (1) a result pointer that links to a location of a cause of said at least one of efficiency problems and fatal errors in said artifact and (2) a result meta data that includes (i) a text description of said at least one of efficiency problems and fatal errors, (ii) date and time of a run resulting in said at least one of efficiency problems and fatal errors, and (iii) input provided for said run.

17. The method according to claim 16, further comprising providing a really simple syndication (RSS) feed of said conformance profile.

18. The method according to claim 16, further importing or exporting said conformance profile.

19. The method according to claim 16, further comprising interactively analyzing said results report to locate an error source.

20. The method according to claim 16, wherein said conformance requirements are selected from the group consisting of individual policy, team policy, department policy, corporate policy, vendor policy, and industry best practice.

\* \* \* \* \*